United States Patent [19]

Bernhardt et al.

[11] Patent Number: 4,868,239
[45] Date of Patent: Sep. 19, 1989

[54] CASTING RESINS ON THE BASIS OF ACRYLIC ACID ESTERS

[75] Inventors: Günther Bernhardt, St. Augustin; Horst Hanisch, Hennef, both of Fed. Rep. of Germany

[73] Assignee: Dynamit Nobel AG, Troisdorf Bez. Cologne, Fed. Rep. of Germany

[21] Appl. No.: 183,254

[22] Filed: Apr. 8, 1988

Related U.S. Application Data

[63] Continuation of Ser. No. 810,499, Dec. 18, 1985, abandoned.

[30] Foreign Application Priority Data

Dec. 22, 1984 [DE] Fed. Rep. of Germany ....... 3447114

[51] Int. Cl.$^4$ .......................... C08K 3/18; C08K 3/22; C08K 3/34; C08L 33/06
[52] U.S. Cl. .................................... 524/506; 524/423; 524/425; 524/430; 524/432; 524/437; 524/447; 524/449; 524/451; 525/288
[58] Field of Search ................ 525/288; 524/506, 423, 524/425, 430, 432, 437, 447, 449, 451

[56] References Cited

U.S. PATENT DOCUMENTS 3,650,812  3/1972  Nordstrom et al. ................ 525/288

FOREIGN PATENT DOCUMENTS 3331371  4/1984  Fed. Rep. of Germany .

*Primary Examiner*—Allan M. Lieberman
*Attorney, Agent, or Firm*—Felfe & Lynch

[57] ABSTRACT

Disclosed are casting resins made from acrylic acid esters with a high content of finely dispersed fillers. The casting resins contain a polymeric organosilicon compound having functional and nonfunctional groups. As functional groups, the copolymer contains one or more alkoxysilyl groups and one or more (meth)acryloxysilyl groups. The copolymer furthermore contains by copolymerization at least one nonfunctional comonomer having an ethylenically unsaturated grouping as well as an additional comonomer of the group of the vinyl carboxylic acid esters and (meth)acrylic acid esters, if desired. The addition of these polymeric organosilanes to known casting resins brings about a greater lowering of the viscosity of these resins, which are used, for example, for the manufacture of sanitary appliances.

8 Claims, No Drawings

CASTING RESINS ON THE BASIS OF ACRYLIC ACID ESTERS

This application is a continuation of application Ser. No. 810,499, filed Dec. 18, 1985, now abandoned.

BACKGROUND OF THE INVENTION

The subject matter of the present invention is casting resins on the basis of hardenable acrylic and methacrylic acid esters and finely divided, inorganic fillers, which contain polymeric organosilicon compounds as adhesivizers.

It is known to mix inorganic fillers with casting resins on the basis of hardenable acrylic and methacrylic acid esters, which will be referred to hereinafter also as unsaturated casting resins. Furthermore, casting resins containing the inorganic fillers in amounts exceeding 50% are known, in which these fillers are to be especially finely divided. In these last-named casting resins the use of monomeric organosilanes as adhesivizers has already been described (cf. German Fed. Pat. No. 24 49 656). These known casting resins containing finely divided fillers have higher densities, greater hardness and improved stiffness in comparison with unfilled unsaturated casting resins.

Furthermore, the inorganic fillers reduce the heating of the resins while they are setting, as well as their shrinkage.

The high content of finely divided fillers, which, when used with monomeric organosilanes as adhesivizers, are uniformly distributed in these casting resins, increases the flexural strength and impact toughness of the moldings made from these resins. The moldings which are made from these known unsaturated casting resins include sanitary articles such as sinks and lavabos.

In the production of these moldings, the unsaturated casting resin is to have the lowest possible viscosity so that, when the molds are filled, they will be completely filled out, and the necessary degree of filling can be maintained. On account of the high content of fillers, this requirement is not met by a great number of unsaturated casting resins. This problem cannot be solved even by the addition of monomeric organic silicon compounds; some organic silicon compounds even work to produce a further increase of the viscosity.

It is already known from German Federal publication No. OS 33 31 371 that monomeric and polymeric organosilicon compounds, when mixed with metallic acid esters of metals of Group IV or V of the periodic system of the elements produce a reduction of the viscosity of the compositions according to German Federal Patent No. 24 49 656. At the same time this system also results in an improvement of the mechanical properties.

The problem existed of further improving the adhesivizer system of organosilicon compounds and metallic acid esters specified in German publication No. OS 33 31 371 by striving for an additional great reduction of viscosity. The casting resins thus obtained were to simultaneously retain the known good physical characteristics of the casting resins in the state of the art, and even improve upon them if possible.

THE INVENTION

To accomplish this object, casting resins have been found on the basis of fluid, hardenable acrylic and methacrylic acid esters and finely divided inorganic fillers which contain as adhesivizing organosilicon compounds reaction products of salts of (meth)acrylic acid with copolymers of (a) vinyl chloroacetate and
(b) alkoxysilyl compounds with a vinyl or methacryloxypropyl moiety and other nonfunctional basic building blocks with ethylenically unsaturated groupings, and they are characterized in that, in the reaction product of the salts of (meth)acrylic acid with the copolymers of (a) vinyl chloroacetate and
(b) alkoxysilyl compounds with a vinyl or methacryloxypropyl moiety, and an additional nonfunctional basic building block with an ethylenically unsaturated grouping of the general formula

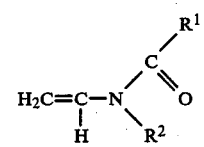

wherein $R^1$ represents $C_1$ to $C_3$ alkyl groups, $R^2$ represents $C_1$ to $C_4$ alkyl groups or $R^1$ and $R^2$ are a common component of a grouping—$(CH_2)_n$ in a ring system

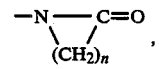

in which n is 3 to 5 and the grouping can be interrupted by an oxygen atom between two carbon atoms thereof, the building block being incorporated by polymerization.

It will be understood that the basic building block or repeated structural unit is chemically connected or bonded with another basic building block.

In spite of the absence of the metallic acid esters named in German No. OS 33 31 371, when the polymeric adhesivizers in accordance with the invention are used, a reduction of the viscosity of the casting resins is achieved, while the good physical characteristics of the cured resins are retained. The unsaturated casting resins according to the invention have, in the uncured state, viscosities which are at least so low as the viscosities of similar casting, in which—in order to obtain these low viscosities—metallic acid esters are additionally present, as claimed in German No. OS 33 31 371. In the production of the casting resins according to the invention, therefore, the additional preparation of an adhesivizer system is eliminated, because only one single organosilicon compound needs to be added.

The amount of polymeric organosilicon compound that is to be used is very small. It is related practically to the filler contained in the casting resin, whose content is variable within wide limits. The polymeric organosilicon compound is generally used in amounts of between 0.1 and 4%, preferably between 0.2 and 2%, of the weight of the filler.

The adhesivizing polymeric organosilicon compounds having a plurality of unsaturated groupings according to the invention are copolymers of a plurality of ethylenically unsaturated compounds. They contain at least three different basic building blocks which are derived from ethylenically unsaturated monomers, each having two chain carbon atoms, one of the basic building blocks being linked to an alkoxysilyl grouping which is connected either directly or through a

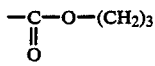

group to this basic building block; the second basic building block contains an alpha-halogen carboxylic acid moiety whose halogen atom is substituted by an acrylic or methacrylic acid moiety. The third basic building block, composed of ethylenically unsaturated groupings, contains no functional groups. As a monomer it is characterized by the general formula:

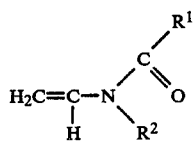

in which $R^1$ represents $C_1$ to $C_3$ alkyl groups, $R^2$ represents $C_1$ to $C_4$ alkyl groups, or $R^1$ and $R^2$ are a common component of a grouping $-(CH_2)_n-$ wherein n can be 3 to 5 and the ring between two carbon atoms can be interrupted by an oxygen atom. In this formula, if $R^1$ and $R^2$ are a common component of a grouping $-(CH_2)_n-$, then the tertiary nitrogen atom is the common component of a ring in which there is a carbonyl group in the alpha position to this tertiary nitrogen atom. Under this formula come vinylic acid amides having a tertiary nitrogen atom, such as for example N-vinylpyrrolidone, N-vinylmethylacetamide or N-vinyl-1,3-oxazidinone.

The content of the individual building blocks in the copolymer can vary widely: the basic building block with the acrylate moiety can be incorporated in proportions between 0.5 to 20 parts by weight, and the one with the silyl moiety in proportions between 0.5 and 30 parts by weight. The balance to make up 100 weight-parts is composed of the nonfunctionalized building block composed of an ethylenically unsaturated grouping, minus the content of the carboxylic acid vinylic or (meth) acrylic acid ester that is to be discussed below, if it is used.

The adhesivizing copolymer can additionally be co-polymerized with vinyl esters of $C_1$ to $C_4$ carboxylic acids or (meth) acrylic acid esters. The content of this component in the copolymer can vary between 10 and 90 weight-parts.

The preparation of the adhesivizing polymeric organosilicon compounds is described in U.S. Pat. No. 4,625,006, to which reference is here especially made.

The resin component of the unsaturated casting resin according to the invention is a hardenable acrylic resin, the term acrylic resin being understood as a liquid polymer of acrylic acid esters, optionally substituted with methyl or ethyl in the alpha position. The ester component can be derived from aliphatic or aromatic alcohols with 1 to 18 carbon atoms, and can be interrupted, if desired, by an ether oxygen atom. These liquid polymers can, if desired, contain an additional solid, no longer crosslinkable polymer from the same group, in solution or dispersion. For medium-reactive resins which do not crosslink in the curing, methylmethacrylate is the preferred ester. Highly reactive resins which crosslink during the cure contain crosslinking components such as ethylene glycol dimethacrylate, and also methacrylates of butenediol or allyl alcohol.

Such resins or resin mixtures, which can be used as components of casting compositions, are known in themselves (cf. German Federal Pat. 24 49 656).

The hardening of these resins or resin mixtures is also performed in a manner known in itself, e.g., by the addition of inorganic peroxides plus, if desired, activators or accelerators, depending on whether the hardening is to be performed at room temperature or elevated temperature.

The casting resin furthermore contains fillers in the form of finely divided particles whose size amounts to no more than 100 micrometers. The preferred grain size ranges are between 0 and 10, 0 and 40 and 0 and 60 micrometers; the mixture according to the invention is especially effective in the case of fillers in the grain size range between 0 and 10 micrometers. The filler can be of natural or synthetic origin; it should have a hardness suitable for the intended application. Fillers of natural origin are, for example, minerals such as aluminum oxides, double oxides of aluminum with alkali and/or alkaline earth metals, silicon dioxide in its various modifications, silicates, aluminosilicates, calcite and other carbonates, carbides, oxides and sulfides. These substances can also be modified by subsequent processes. Examples of these fillers are: quartz flour, kaolin, talc, mica, alumina, zinc white, chalk, limestone, dolomite, gypsum, blanc fixe and hydrated aluminum oxides. Examples of synthetically produced fillers are glass flour, slag ash, and finely divided synthetic silicon dioxide.

The modified casting resins according to the invention contain at least 20% of these fillers by weight. Their maximum content can be about 80% by weight. Preferably, the content of the fillers in the finished casting resin can be between 50 and 70% by weight.

On the basis of the presence of the mixture according to the invention, of unsaturated organosilicon compound and metallic acid esters, the use of a dispersant, as described in German patent No. 24 49 656 as obligatory for the preparation of the casting resins therein described, is unnecessary. The fillers are uniformly distributed, free of aggregation, in the unsaturated, liquid casting resin, if this resin has otherwise been prepared by the known methods.

Like the known liquid, filled casting resins, the casting resins according to the invention can also contain, in addition to the fillers, fibrous reinforcing materials which do not have to satisfy the requirements of fineness. These fibers include, for example, glass fibers, rock fibers, or asbestos. The content of these reinforcing materials, however, is not to be greater than the content of the finely granular fillers.

If desired, the casting resins according to the invention can be colored with pigments and/or dyes. It is advantageous to use for this purpose products which are resistant to yellowing, carbonization and cracking. The following are given as examples: iron oxides, titanium dioxide, blanc fixe, zinc white, ultramarine blue, and carbon black.

The preparation of the liquid, hardenable casting resins according to the invention is performed in a known manner, such as the manner described in German Pat. No. 24 49 656. In general, first the additives according to the invention are mixed with the liquid, unsaturated resin, and then the fillers and the reinforcing agents, if any, are dispersed in the mixture thus obtained. The resin mixture can already contain the hardening catalyst, especially if the casting resin is to be hardened by heat. It is desirable, however, to mix in the catalyst and the accelerator, if any, just before hardening the composition, and then to produce the desired casting.

The compositions according to the invention can be used, for example, for making sanitary fixtures, such as lavabos, shower pans, sinks or toilet bowls, or moldings for the construction industry, such as machine bases, machine beds, or tanks.

EXAMPLE 1

Several casting compositions were prepared, each in the same manner, using an unsaturated polymeric organosilane in the following manner:

In each case a mixture of 105 g of a highly reactive methacrylate resin (copolymer of methacrylate and acrylate with a molecular weight between 70,000 and 100,000, dissolved in methylmethacrylate) was placed with 35 g of methyl methacrylate in a measuring vessel, and the amounts of unsaturated polymeric organosilane listed in Table 1 were mixed into this solution. Then, using a whisk stirrer at 2,000 rpm, over a period of about 10 minutes, first 210 g of a fine quartz flour (grain size range 0 to 40 microns) and then 1.4 g of ultramarine blue pigment were dispersed therein.

Table 1 lists the viscosities of the compositions thus obtained. The viscosities of the compositions according to the invention are lower than they are for compositions containing metallic acid esters and unsaturated monomeric organosilanes or metallic acid esters and other unsaturated polymeric organosilanes according to German publication 33 31 371 (examples (a) and (b) given for comparison).

The determination of the viscosity was performed with a Brookfield RV viscosimeter. The temperature of each sample was established at 20° C., and the samples were tested after the stated period of standing time. The measurements were performed with a No. 5 spindle at 10 and 50 rpm.

used as an approximately 45% solution in a 3.1 : 1 mixture of methyl glycol acetate and ethanol.

UPO 3: Reaction product of sodium acrylate and a polymer that has been prepared from:
  5 weight-parts vinyltriethoxysilane
  30 weight-parts vinylpyrrolidone
  5 weight-parts vinyl chloroacetate
  60 weight-parts vinyl acetate
used as an approximately 45% solution in ethanol.

UPO 4: Reaction product of sodium acrylate with a polymer that has been prepared from:
  15 weight-parts vinyltriethoxysilane
  30 weight-parts vinyl methyl acetamide
  5 weight-parts vinyl chloroacetate
  50 weight-parts vinyl acetate
used as 45% solution in a 3.2 : 1 mixture of toluene and ethanol.

UPO 5: Reaction product of sodium acrylate and a polymer
  that has been prepared from:
  5 weight-parts vinyltrimethoxysilane
  5 weight-parts vinyl chloroacetate
  90 weight-parts vinyl acetate
used in an approximately 45% solution in toluene.

MEMO: Gamma-methacryloxypropyltrimethoxysilane

MEMIG: Mixture of 1 mole titanium butylate and 4 moles acetic acid ester.

EXAMPLE 2

In each case, 0.7 g of an activator and a peroxide catalyst specific for the acrylic resin was stirred into the samples of Example 1 after a deaeration period of about 16 hours, and the mixture was used in casting plates measuring 200×200×4 mm. The plates hardened within 20 minutes. They were then cured for another 14 hours at 80° C.

To determine the flexural strength and impact toughness, standard specimens measuring 50×6×4 mm were

TABLE 1

Viscosity of Pigmented Quartz Flour/Acrylate Resin Mixtures

| Sample No. | UPO 1 [parts]* | UPO 2 [parts]* | UPO 3 [parts]* | UPO 4 [parts]* | MEMO [parts]* | UPO 5 [parts]* | MEMIG [parts*] | Viscosity [mPa · s] 10 rpm 2 h | 10 rpm 24 h | 50 rpm 2 h | 50 rpm 24 h |
|---|---|---|---|---|---|---|---|---|---|---|---|
| (1) | — | — | — | — | — | — | — | 11200 | 11200 | 5900 | 6000 |
| (2) | 0.5 | — | — | — | — | — | — | 2400 | 2600 | 2300 | 2700 |
| (3) | — | 0.5 | — | — | — | — | — | 2300 | 2700 | 2000 | 2500 |
| (4) | — | — | 0.5 | — | — | — | — | 2500 | 3000 | 2500 | 3000 |
| (5) | — | — | — | 0.5 | — | — | — | 2200 | 2500 | 2100 | 2500 |
| Examples for Comparison | | | | | | | | | | | |
| (a) | — | — | — | — | 0.4 | — | 0.1 | 6800 | 5200 | 5000 | 4000 |
| (b) | — | — | — | — | — | 0.4 | 0.1 | 4200 | 3600 | 3800 | 3700 |

*with respect to 100 parts of filler.

Explanation of Table 1
UPO: Unsaturated polymeric organosilane
UPO 1: Reaction product of sodium acrylate and a polymer that has been prepared from:
  15 weight-parts vinyltriethoxysilane
  20 weight-parts vinylpyrrolidone
  5 weight-parts vinyl chloroacetate
  60 weight-parts vinyl acetate
used as an approximately 45 % solution in ethanol.

UPO 2: Reaction product of sodium acrylate and a polymer
  that has been prepared from:
  15 weight-parts vinyltriethoxysilane
  30 weight-parts vinylpyrrolidone
  5 weight-parts vinyl chloroacetate
  50 weight-parts vinyl acetate sawed from the plates. The physical characteristics of these specimens are given in Table 2.

TABLE 2

| Sample No. | | Flexural strength [N/sq. mm.] DIN 53452 Direct | After 6 h boiling | Impact toughness [kJ/sq. m.] DIN 53453 Direct | After 6 h boiling |
|---|---|---|---|---|---|
| 1 | Blank test | 67 | 54 | 2.0 | 1.6 |
| 2 | Per invention | 113 | 116 | 5.2 | 5.2 |
| 3 | Per invention | 102 | 108 | 4.6 | 4.2 |
| 4 | Per invention | 105 | 105 | 4.8 | 4.1 |
| 5 | Per invention | 124 | 110 | 4.8 | 4.2 |
| a | Example for comparison | 92 | 111 | 2.8 | 4.2 |
| b | Example for | 100 | 103 | 4.4 | 4.4 |

TABLE 2-continued

| Sample No.* | Flexural strength [N/sq. mm.] DIN 53452 | | Impact toughness [kJ/sq. m.] DIN 53453 | |
|---|---|---|---|---|
| | Direct | After 6 h boiling | Direct | After 6 h boiling |
| comparison | | | | |

*See Table 1

The physical data on the compositions according to the invention are accordingly not inferior to those given in German No. OS 33 31 371, and in some cases they are better It will be understood that the specification and examples are illustrative but not limitative of the present invention and that other embodiments within the spirit and scope of the invention will suggest themselves to those skilled in the art.

What is claimed is:

1. A casting resin comprising:
hardenable fluid acrylic and methacrylic acid esters; 20 to 80 wt.-% of finely divided inorganic filler having a particle size of no greater than 100 microns; 0.1 to 4 wt.-% with respect to the proportion of the filler of an adhesivizing polymeric organosilicon compound which is a reaction product of salts of (meth)acrylic acid with a copolymer of 0.5 to 20 parts by weight of vinyl chloroacetate and 0.5 to 30 parts by weight of an alkoxysilyl compound having a vinyl or methacryloxy-propyl moiety; and the balance to make up 100 weight parts, less the acid ester content, of a nonfunctional basic building block having an ethylenically unsaturated grouping and being of the general formula

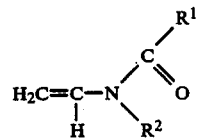

wherein $R^1$ represents $C_1$ to $C_3$ alkyl groups, $R^2$ represents $C_1$ to $C_4$ alkyl groups or $R^1$ and $R^2$ are a common component of a grouping $-(CH_2)_n-$ in a ring system

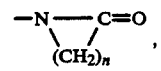

in which n is 3 to 5, and the grouping can be interrupted by an oxygen atom between two carbon atoms thereof, said building block being incorporated by polymerization into the reaction product of the salts of (meth)acrylic acid with the copolymers.

2. The casting resin according to claim 1, wherein the nonfunctional basic building block is N-vinylpyrrolidone or N-vinylacetamide.

3. The casting resin according to claim 1, wherein the nonfunctional basic building block additionally contains a vinyl ester of $C_1$ to $C_4$-carboxylic acids or (meth)acrylic acid ester.

4. The casting resin according to claim 2, wherein the nonfunctional basic building block additionally contains a vinyl ester of $C_1$ to $C_4$-carboxylic acids or (meth)acrylic acid ester.

5. The casting resin according to claim 1, wherein the adhesivizing polymeric organosilane compound is present in an amount of 0.4 to 1.2 wt.-% with respect to the proportion of the fillers.

6. The casting resin of claim 1, wherein the nonfunctional basic building block is N-vinyl-1,3-oxazidinone.

7. The casting resin of claim 1 wherein the polymeric organosilicon compound is present in an amount of 0.2 to 4 wt.-% with respect to the proportion of the fillers.

8. The casting resin of claim 1 wherein the alkoxysilyl compound is vinyltriethoxysilane.

* * * * *

UNITED STATES PATENT AND TRADEMARK OFFICE
CERTIFICATE OF CORRECTION

PATENT NO. : 4,868,239

DATED : September 19, 1989

INVENTOR(S) : Günther Bernhardt et al

It is certified that error appears in the above-identified patent and that said Letters Patent is hereby corrected as shown below:

Column 8, line 34, "organosilane" should read --organosilicon--.

Signed and Sealed this

Sixteenth Day of October, 1990

Attest:

HARRY F. MANBECK, JR.

*Attesting Officer*   *Commissioner of Patents and Trademarks*